United States Patent [19]

McCusker et al.

[11] 4,301,204

[45] Nov. 17, 1981

[54] SHEET USEFUL AS ROOFING

[75] Inventors: Joseph H. McCusker, Raynham, Mass.; Philip R. Siener, Jr., Greene, R.I.

[73] Assignee: Cooley Incorporated, Pawtucket, R.I.

[21] Appl. No.: 209,721

[22] Filed: Nov. 24, 1980

[51] Int. Cl.³ .................. B32B 5/08; B32B 5/10; B32B 27/08; B32B 27/20
[52] U.S. Cl. .................... 428/110; 428/111; 428/224; 428/246; 428/247; 428/252; 428/257; 428/317; 428/328; 428/483; 428/522
[58] Field of Search ............. 428/110, 111, 224, 220, 428/246, 247, 252, 257, 317, 328, 483, 522

[56] References Cited

U.S. PATENT DOCUMENTS

| | | | |
|---|---|---|---|
| 3,222,237 | 12/1965 | McKelvy | 428/110 |
| 3,822,176 | 7/1974 | Harrison | 428/224 |
| 3,900,625 | 8/1975 | Chen | 428/110 |
| 4,113,907 | 9/1978 | Haage et al. | 428/111 |
| 4,115,614 | 9/1978 | Martin, Jr. | 428/220 |

FOREIGN PATENT DOCUMENTS 1551258  8/1979  United Kingdom ............... 428/328

Primary Examiner—William J. Van Balen

[57] ABSTRACT

Material useful as sheet roofing is made up of a foraminous, stress-free reinforcing layer covered with layers of titanium dioxide bearing unplasticized chlorinated polyethylene.

4 Claims, 3 Drawing Figures

SHEET USEFUL AS ROOFING

FIELD OF THE INVENTION

This invention relates to sheet material particularly useful as roofing.

BACKGROUND OF THE INVENTION

There has been known in the prior art sheet roofing formed of nylon or of calendared, plasticized chlorinated polyethylene. Also in the prior art, so-called "weft insertion" fabrics have been used as reinforcing layers, e.g. in wrestling mats.

SUMMARY OF THE INVENTION

We have discovered that a highly desirable sheet roofing may be obtained by extruding onto a stress-free, foraminous, dimensionally stable fabric layer layers of an unplasticized chlorinated polyethylene carrying in it titanium dioxide whitener.

Sheet materials of the invention have many advantages. They are highly stable, both chemically and dimensionally. They have high infrared reflectivity, and maintain high reflectivity over long periods of time. They are easy to patch, self-cleaning, and resistant to wind uplift.

In the most preferred embodiment, a three-thread weft insertion heat set polyester fabric is used. This provides reinforcement which is stress-free, anti-wicking, and antifungal.

RELATION TO OTHER APPLICATIONS

The plastic formulations set forth herein were the invention of the undersigned, Joseph H. McCusker.

PREFERRED EMBODIMENT

We turn now to description of the drawings and the structure and operation of the preferred embodiment.

DRAWINGS

STRUCTURE

Figure 1:
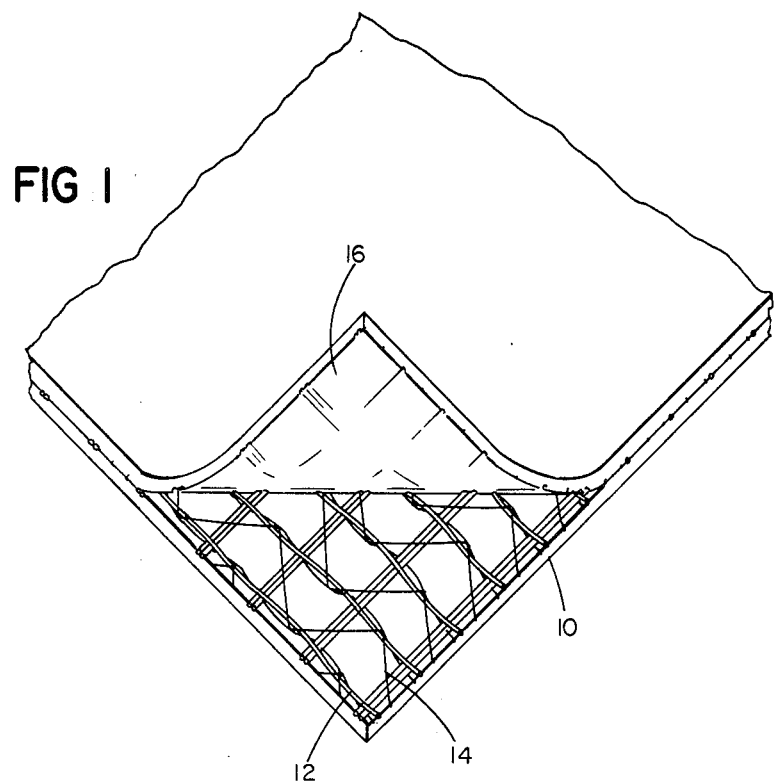
FIG. 1 is a partial, perspective view, partially broken away and exploded, of sheet material according to our invention.

There is diagrammatically illustrated in FIG. 1 a sheet material particularly useful as a roofing material. It contains a lower layer 10 of unplasticized chlorinated polyethylene formulated as follows:

| | |
|---|---|
| Chlorinated Polyethylene (CPE) (manufactured by Dow Chemical) | 250.0 parts |
| Titanium Dioxide, Rutile type (manufactured by National Lead, "Titanox 2010") | 50.0 parts |
| Phosphate Chelator (manufactured by Argus Chemical, "Stabilizer Mark 1117") | 5.0 parts |
| Barium - Cadmium Stabilizer (manufactured by Argus Chemical, "Mark Q180") | 1.25 parts |
| Epoxy - Soya (manufactured by Argus Chemical, "Drapex 6.8") | 1.25 parts |
| Dilauryldithio-dipropionate (manufactured by Argus Chemical) | 2.0 parts |
| Octadecyl B (3, 5-t-butyl 4 - hydroxyphenyl propionate, manufactured by Ciba - Giegy, "Irgonox 1076") | 2.0 parts |
| Stearic Acid | 1.25 parts |

The titanium dioxide is a good infrared reflector and provides an attractive white color. Freedom from a plasticizer conduces to stability and long life. The formulation is designed for intensive mixing and then extrusion coating. Intermediately of the sandwich is a reinforcing layer of stress-free, weft insertion fabric 12 in which in addition to warp and weft threads which bear simply overlying relationships, (not interwoven) are a third set of strands 14 tying together warp and woof.

Finally, there is a top layer 16 corresponding to the bottom layer 10.

Figure 2:
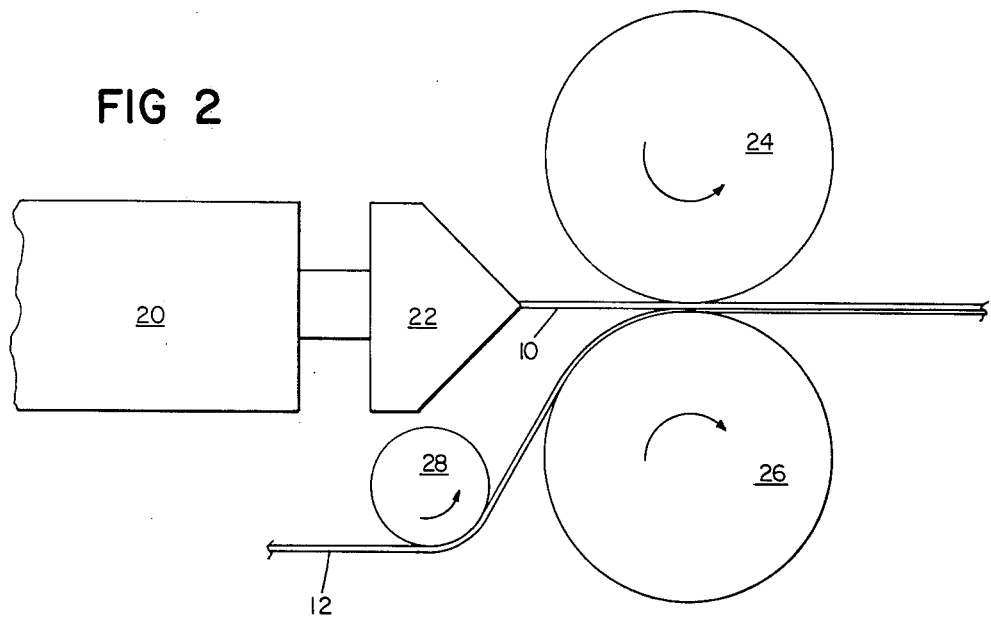
FIG. 2 is a diagrammatic drawing illustrating manufacture of said sheet material.

Application of a layer 14 of plastic compound to reinforcing layer 12 is illustrated in FIG. 2. Plastic is forced from extruder 20 through die 22 and into the nip of temperature controlled high pressure squeeze rolls 24 and 26. At the same time, web 12 is fed over idler roll 28 between feed nip, uniting layers 10 and 12. Layer 16 is laminated onto the other side of web 12 in a subsequent operation (not illustrated).

OPERATION

Figure 3:
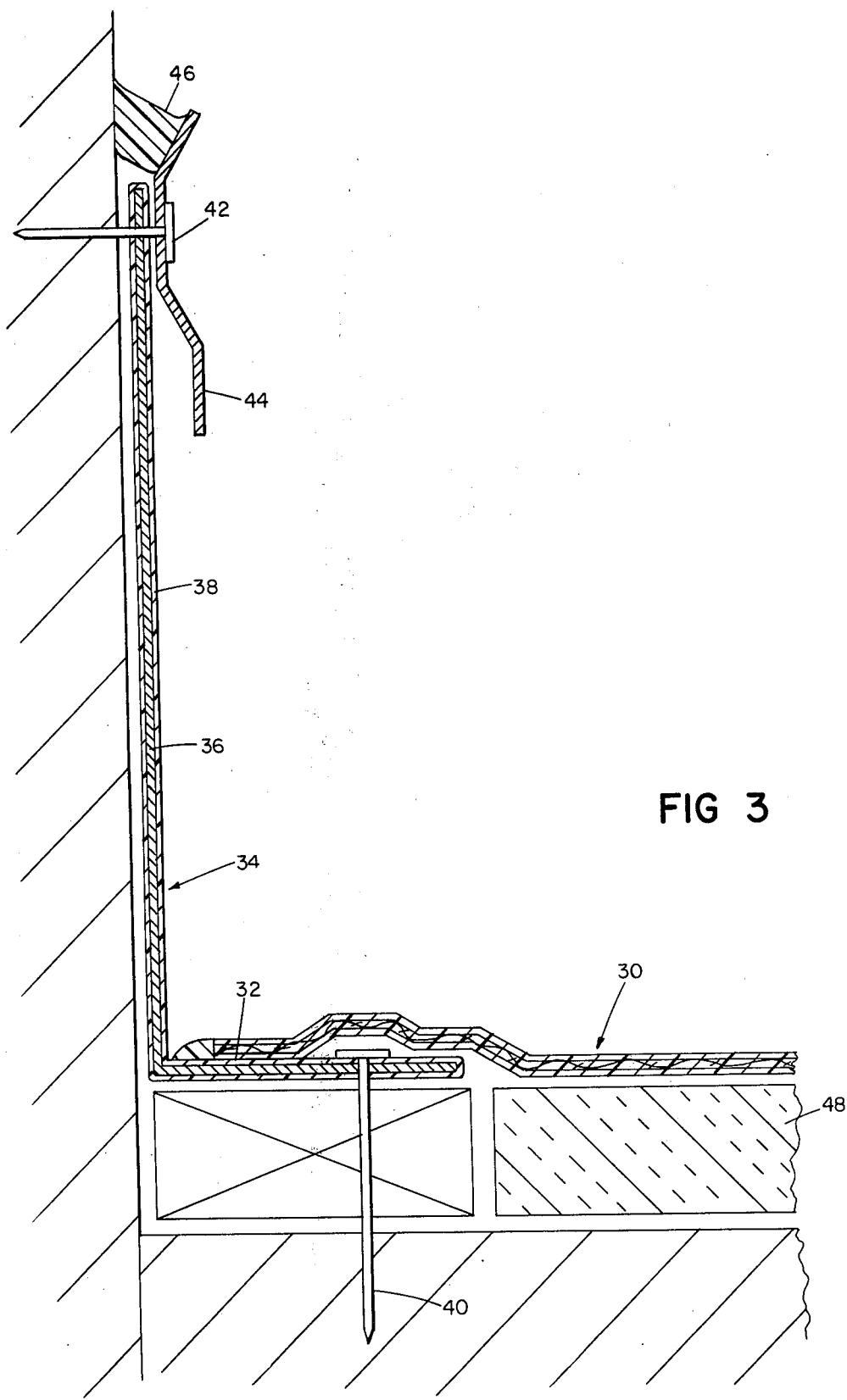
FIG. 3 is a diagrammatic view of the installation of said sheet material.

A preferred way of using the sheet of our invention is disclosed in FIG. 3.

A portion of a sheet according to the invention is diagrammatically indicated at 30. The sheet 30 is joined in a 2-inch wide thermoweld 32 to an angle element indicated generally at 34, which runs along the wall of the building and consists of a steel core 36 coated with the chlorinated polyethylene formula material above disclosed. Angle element 34 is sealed to the roof through nail 40. Nail 42 is shown diagrammatically securing reglet 44 and angle element 34 and caulking material 46 is applied. Insulation 48 is shown.

What is claimed is:

1. A sheet comprising a first layer formed from a plastic resin composition,
   a second layer formed from said plastic resin composition, and a third layer sandwiched between said first layer and said second layer,
   the plastic in said plastic resin composition consisting of chlorinated polyethylene,
   said plastic resin composition containing titanium dioxide but no plasticizer,
   said third layer comprising a foraminous, stressfree reinforcing layer.

2. The sheet of claim 1 in which said third layer is a "weft insertion" fabric.

3. The sheet of claim 2 in which said fabric comprises heat-set polyester.

4. The sheet of claim 3 in which, of about 300 parts, said chlorinated polyethylene constitutes about 250 parts and said titanium dioxide constitutes about 50 parts.

* * * * *